US012802519B2

(12) United States Patent
Jadeja

(10) Patent No.: US 12,802,519 B2
(45) Date of Patent: Nov. 17, 2026

(54) ELECTRONIC GAMING MACHINE WITH DISPLAY HAVING COMPONENT PASSTHROUGH

(71) Applicant: Aristocrat Technologies, Inc., Las Vegas, NV (US)

(72) Inventor: Rajendrasinh Jadeja, Las Vegas, NV (US)

(73) Assignee: Aristocrat Technologies, LLC, Las Vegas, NV (US)

( * ) Notice: Subject to any disclaimer, the term of this patent is extended or adjusted under 35 U.S.C. 154(b) by 213 days.

(21) Appl. No.: 18/671,836

(22) Filed: May 22, 2024

(65) Prior Publication Data

US 2024/0312297 A1 Sep. 19, 2024

Related U.S. Application Data

(63) Continuation of application No. 17/726,394, filed on Apr. 21, 2022, now Pat. No. 12,027,010.

(60) Provisional application No. 63/211,915, filed on Jun. 17, 2021.

(51) Int. Cl.
*G07F 17/32* (2006.01)

(52) U.S. Cl.
CPC ...... *G07F 17/3216* (2013.01); *G07F 17/3211* (2013.01)

(58) Field of Classification Search
None
See application file for complete search history.

(56) References Cited

U.S. PATENT DOCUMENTS

| | | | | |
|---|---|---|---|---|
| 8,235,795 | B2 * | 8/2012 | Green | G07F 17/3213 463/20 |
| 8,272,957 | B2 * | 9/2012 | Crowder, Jr. | G07F 17/3211 463/31 |
| 8,715,079 | B1 * | 5/2014 | Loose | G07F 17/3211 463/31 |
| 9,101,826 | B2 * | 8/2015 | Lee | G07F 17/34 |
| 10,362,690 | B2 * | 7/2019 | Han | G09F 9/301 |
| 11,363,728 | B2 * | 6/2022 | Kwon | H05K 5/03 |
| 12,083,419 | B2 * | 9/2024 | Hennessy | G07F 17/3216 |

(Continued)

OTHER PUBLICATIONS

Office Action (Non-Final Rejection) dated Jan. 31, 2024 for U.S. Appl. No. 17/726,394 (pp. 1-9).

(Continued)

*Primary Examiner* — Sunit Pandya
(74) *Attorney, Agent, or Firm* — ALG Intellectual Property, LLC

(57) ABSTRACT

An electronic gaming machine having one or more displays, any of which may be formed to have a component passthrough to define a recess in an edge or interior of the display. Alternately, the display may be cut, punched, notched, ground, etched, or otherwise have material removed to create a component passthrough. A component passthrough is a recess in an otherwise linear edge of a display, or an aperture formed within an area of a display. Component passthroughs may by holes (of any shape or size), cutouts or notches (again, of any shape or size), angled corners, and the like. A component passthrough is discussed herein as being "within" a display; the term "within" encompasses component passthroughs formed on edges of a display or in an area of a display.

19 Claims, 12 Drawing Sheets

(56) References Cited

U.S. PATENT DOCUMENTS

| | | | | |
|---|---|---|---|---|
| 2010/0190552 | A1* | 7/2010 | Rasmussen | G07F 17/3211 463/34 |
| 2012/0220360 | A1* | 8/2012 | Kelly | G07F 17/3202 463/31 |
| 2013/0040731 | A1* | 2/2013 | Bernard | G07F 17/3213 463/30 |
| 2013/0157751 | A1* | 6/2013 | Loose | G07F 17/3211 463/25 |
| 2014/0274372 | A1* | 9/2014 | Rosander | G07F 17/3209 463/31 |
| 2014/0342800 | A1* | 11/2014 | Kitamura | G07F 17/3213 463/20 |
| 2015/0187166 | A1* | 7/2015 | Hennessy | G07F 17/3211 463/31 |
| 2018/0075689 | A1* | 3/2018 | Castro | A63F 13/28 |

OTHER PUBLICATIONS

Office Action (Notice of Allowance and Fees Due (PTOL-85)) dated May 8, 2024 for U.S. Appl. No. 17/726,394 (pp. 1-8).

* cited by examiner

ELECTRONIC GAMING MACHINE WITH DISPLAY HAVING COMPONENT PASSTHROUGH

CROSS-REFERENCE TO RELATED APPLICATIONS

This application is a continuation of U.S. patent application Ser. No. 17/726,394, titled "Electronic Gaming Machine with Display Having Component Passthrough" filed Apr. 21, 2022, which claims priority to, and incorporates by reference, U.S. Provisional Application Ser. No. 63/211,915, titled "Electronic Gaming Machine with Display Having Component Passthrough" filed on Jun. 17, 2021.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Embodiments described herein take the form of an electronic gaming machine ("EGM") having one or more displays, any of which may be formed to have a component passthrough to define a recess in an edge or interior of the display. Alternately, the display may be cut, punched, notched, ground, etched. or otherwise have material removed to create a component passthrough. As used herein, a "component passthrough" is a recess in an otherwise linear edge of a display, or an aperture formed within an area of a display. Component passthroughs may by holes (of any shape or size), cutouts or notches (again, of any shape or size), angled corners, and the like. A component passthrough is discussed herein as being "within" a display; the term "within" encompasses component passthroughs formed on edges of a display or in an area of a display.

The component passthrough within the display acts as a passthrough, permitting light, sound, data signals, wireless protocols, other electromagnetic radiation, and the like to pass from an interior of an EGM to an exterior without being shielded or attenuated by the display or the EGM's housing. Accordingly, certain components of the EGM may be concealed behind the display and within an interior volume of a housing but still communicate with or to an environment external to the EGM. For example, a speaker may be placed behind the EGM's display and transmit audio through the component passthrough to an external environment, thereby concealing the speaker while reducing or eliminating any effect on its outputted audio that would otherwise result from the display's structure blocking or muffling such audio. As yet another example, a sensor may be placed within the interior volume of the EGM's housing and output signals or receive data through the component passthrough. Any suitable sensor, including electromagnetic radiation sensors, data transceivers, audio sensors, and the like, may be positioned within an interior volume defined by a housing and/or at least partially behind a display while transmitting or receiving through the component passthrough. A camera may likewise be so concealed.

DETAILED DESCRIPTION

Figure 1:
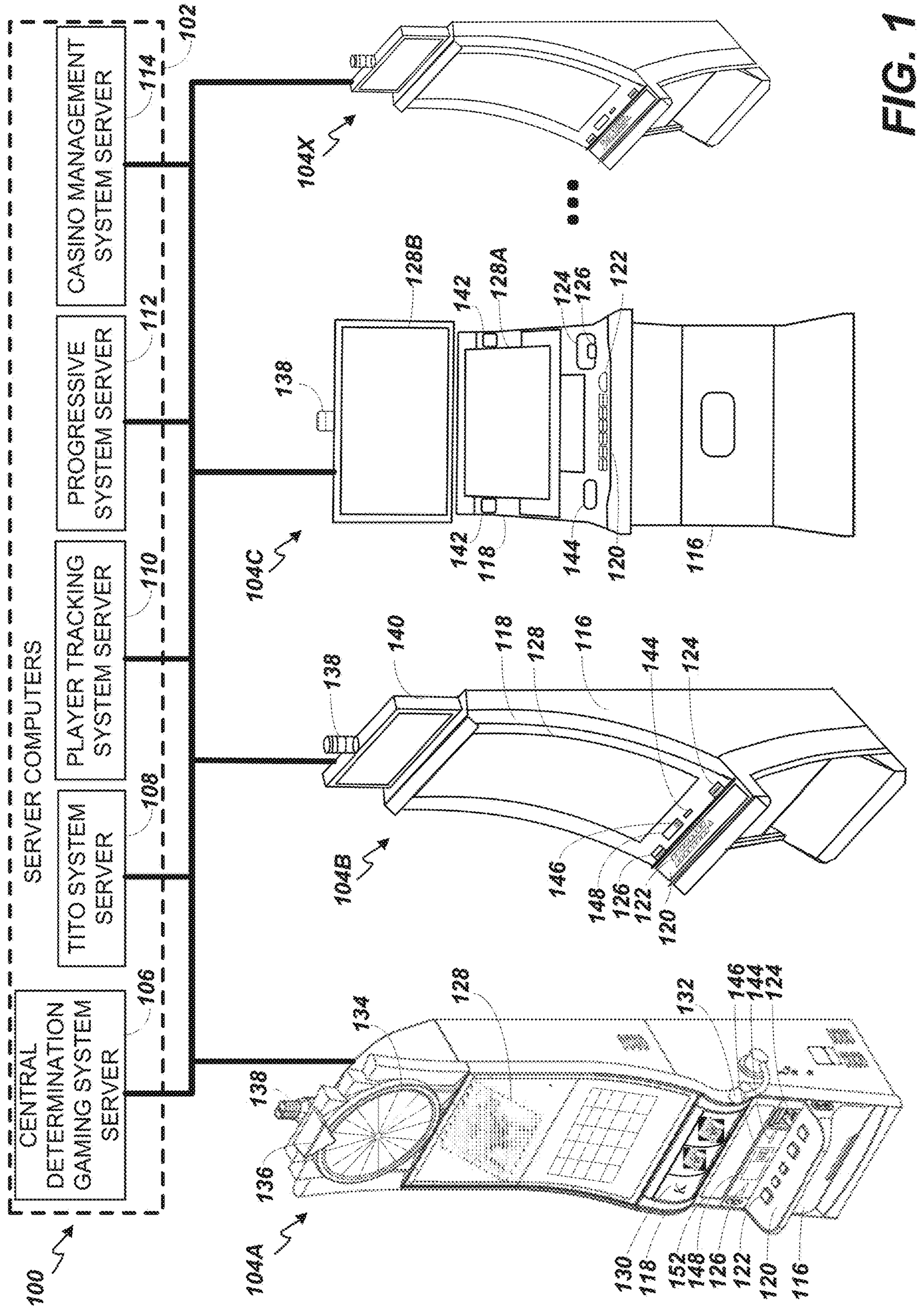
FIG. 1 is an exemplary diagram showing several EGMs networked with various gaming related servers.

Embodiments described herein take the form of an electronic gaming machine ("EGM") having one or more displays, any of which may be formed to have a component passthrough to define a recess in an edge or interior of the display. Alternately, the display may be cut, punched, notched, ground, etched. or otherwise have material removed to create a component passthrough. As used herein, a "component passthrough" is a recess in an otherwise linear edge or corner of a display, or an aperture formed within an area of a display. Component passthroughs may be holes of any shape or size, cutouts or notches (again, of any shape or size), angled corners, and the like. A component passthrough is discussed herein as being "within" a display; the term "within" encompasses component passthroughs formed on edges of a display or in an area of a display.

The component passthrough within the display permits light, sound, data signals, wireless protocols, other electromagnetic radiation, and the like to pass from an interior volume of an EGM to an exterior without being shielded or attenuated by the display or the EGM's housing. Accordingly, certain components of the EGM may be concealed behind the display and within the interior volume of the housing but still communicate with or to an environment external to the EGM. For example, a speaker may be placed behind the EGM's display and transmit audio through the component passthrough to an external environment, thereby concealing the speaker while reducing or eliminating any effect on its outputted audio that would otherwise result from the display's structure blocking or muffling such audio. As yet another example, a sensor may be placed within the EGM's housing and output signals or receive data through the component passthrough. Any suitable sensor, including electromagnetic radiation sensors, data transceivers, audio sensors, and the like, may be positioned within an interior volume of the housing and/or at least partially behind a display while transmitting or receiving through the component passthrough. A camera may likewise be so concealed.

In some embodiments, all or a portion of: a ticket printer; bill validator, card reader, or digital payment mechanism (or other wager acceptance mechanism); player tracking system; or other gaming component may be concealed behind the display and accessible through the component passthrough. For example, a slot may be exposed by the component passthrough to accept a bill, ticket, card, or the like, while other portions of the wager acceptance mechanism that are connected to the slot are concealed by the display.

The component passthrough may be visible to a player or other observer in certain embodiments. In other embodiments, the component passthrough may be visually opaque and appear as part of a border around, or region within, a display. In some embodiments the component passthrough may be positioned in a portion of the display that is not illuminated during gameplay so that its existence is generally concealed. Although the component passthrough may be visually opaque, it may be generally transparent to other frequencies of electromagnetic radiation and/or sound waves (whether generally or within a certain frequency band).

In some embodiments, the component passthrough may function as an access to a component behind the display. For example, a port, latch, cover, or the like may be positioned within or beneath the component passthrough, and so within an interior volume of an EGM housing, and may provide a technician or operator access to an internal volume of the EGM, or to one or more components within the EGM. In such embodiments, a glass, cover, or other overlying portion of the display may be cut to mimic or mirror the component passthrough, while in other embodiments the component passthrough may be formed only in an LED or LCD panel itself (or another light-emitting layer, along with any suitable substrates).

FIG. 1 illustrates several different models of EGMs which may be networked to various gaming related servers; any of these EGMs may include a component passthrough. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor. Typically, the display 128 includes a light-emitting layer or "display layer" on which images are shown and a cover layer over the light-emitting layer. As discussed in more detail herein, the display 128 (or any other display) may include a component passthrough, behind which another component of the EGM may be located.

In some implementations, the bill validator 124, which is one example of a wager acceptance mechanism, may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
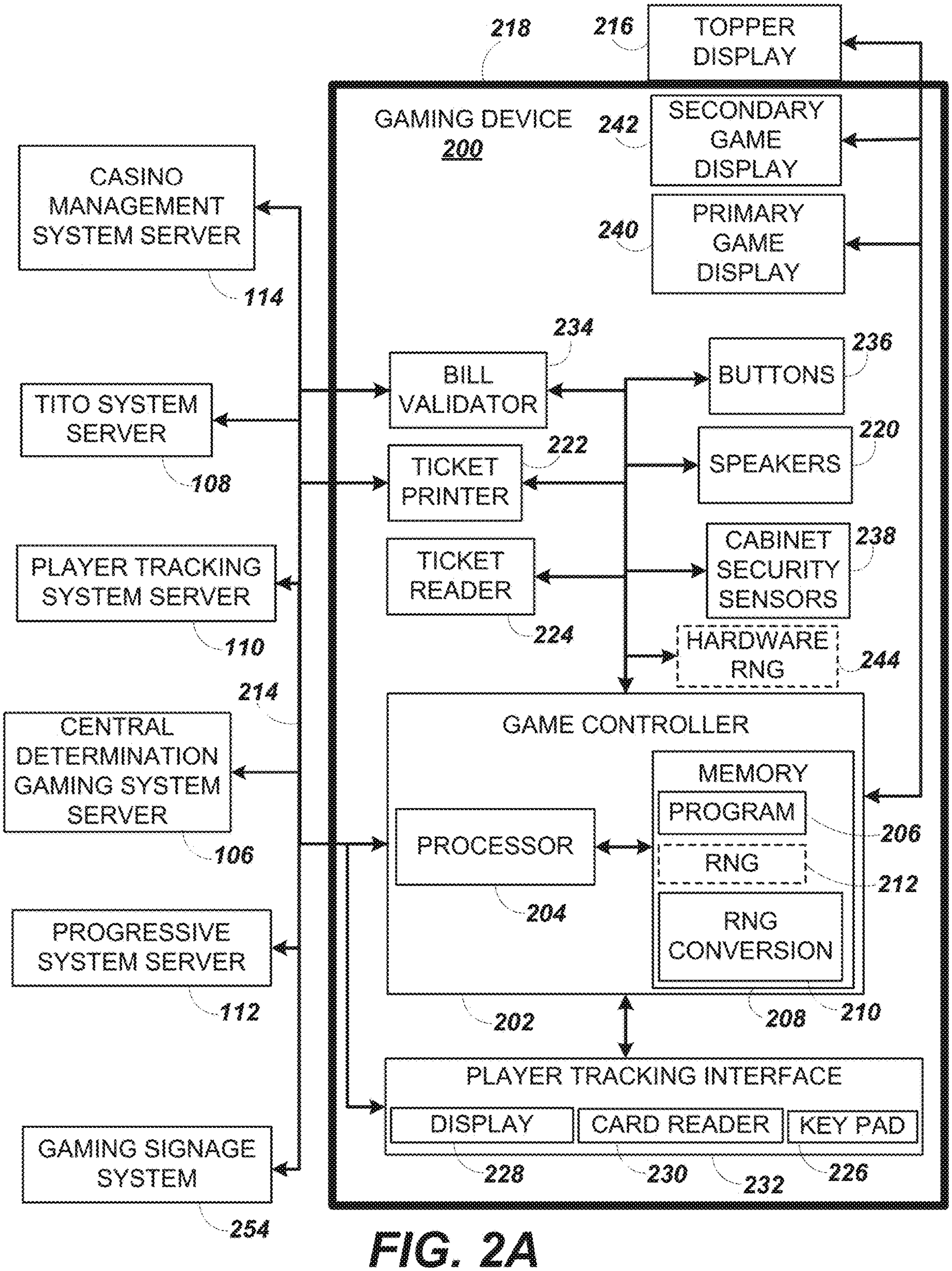
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 (which is another example of a wager acceptance mechanism) which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator or other wager acceptance mechanism 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204. In many instances, the processor 204 is electronically connected to the wager acceptance mechanism and/or a server to process an item of value (such as a ticket, credit balance, credit card transaction, money, or the like) by a player and provide credit to play games on or through the EGM in the amount of the wager.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator or other wager acceptance mechanism 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240, which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be “cashed-in” for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate case of description and explanation.

Figure 2B:
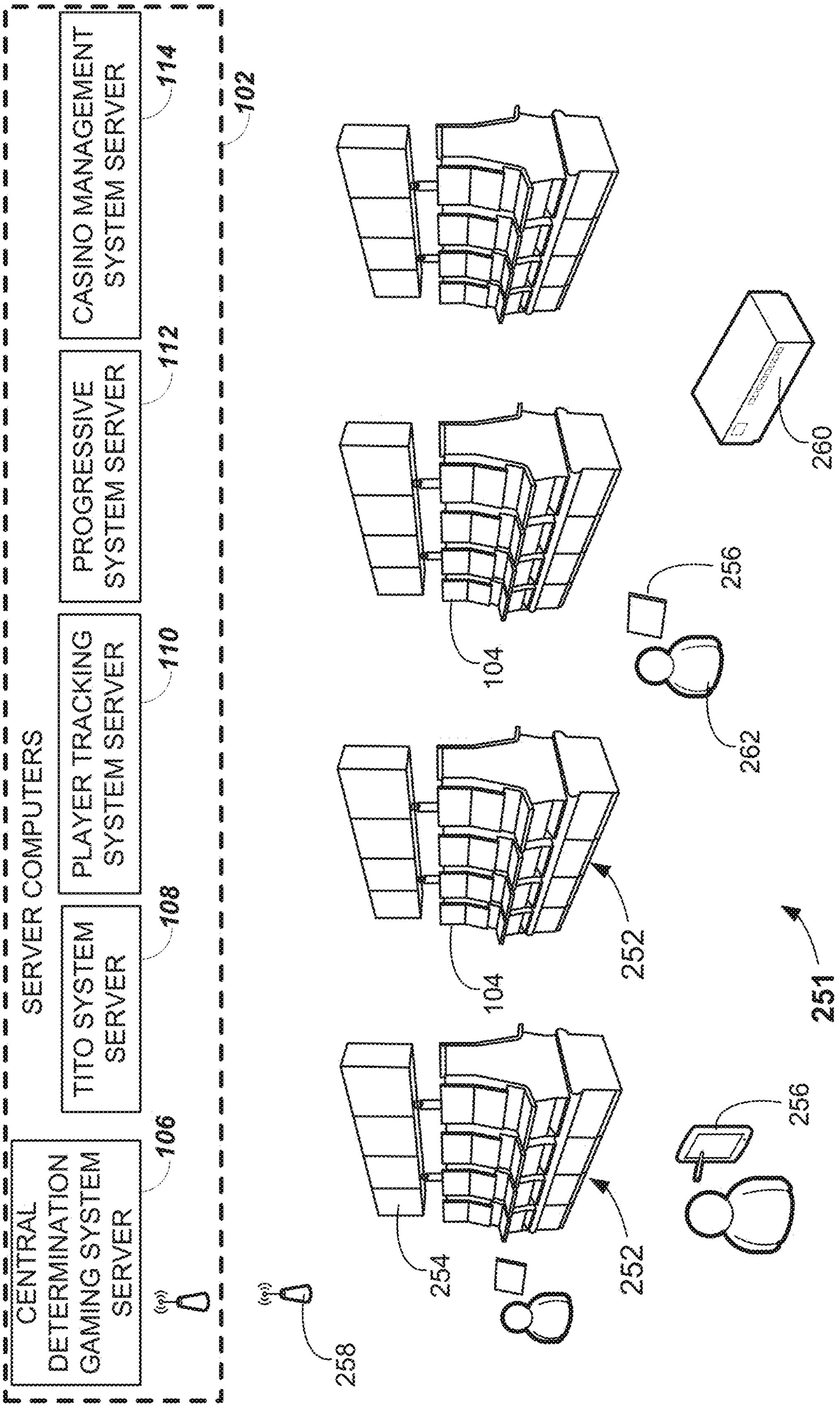
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
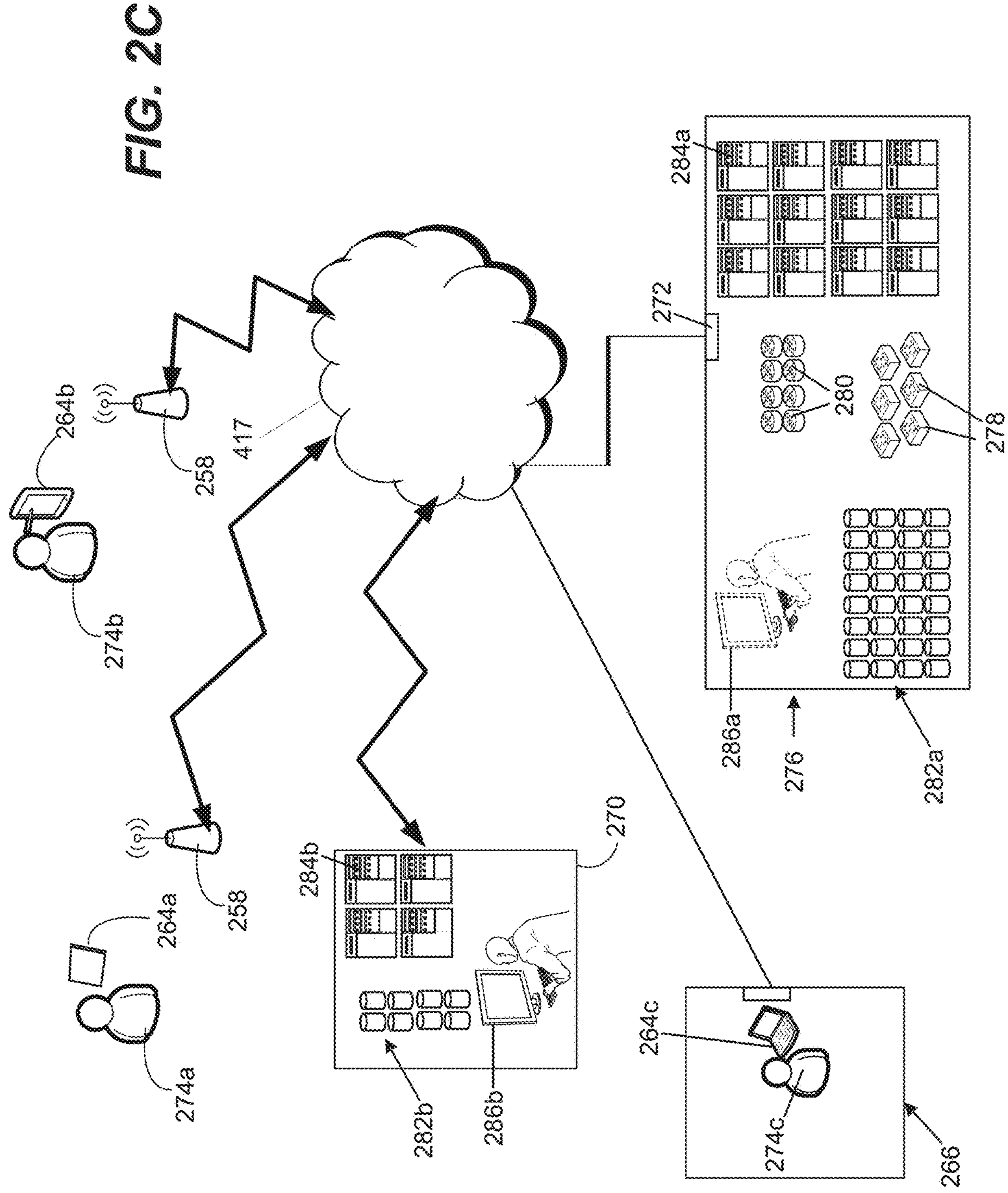
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
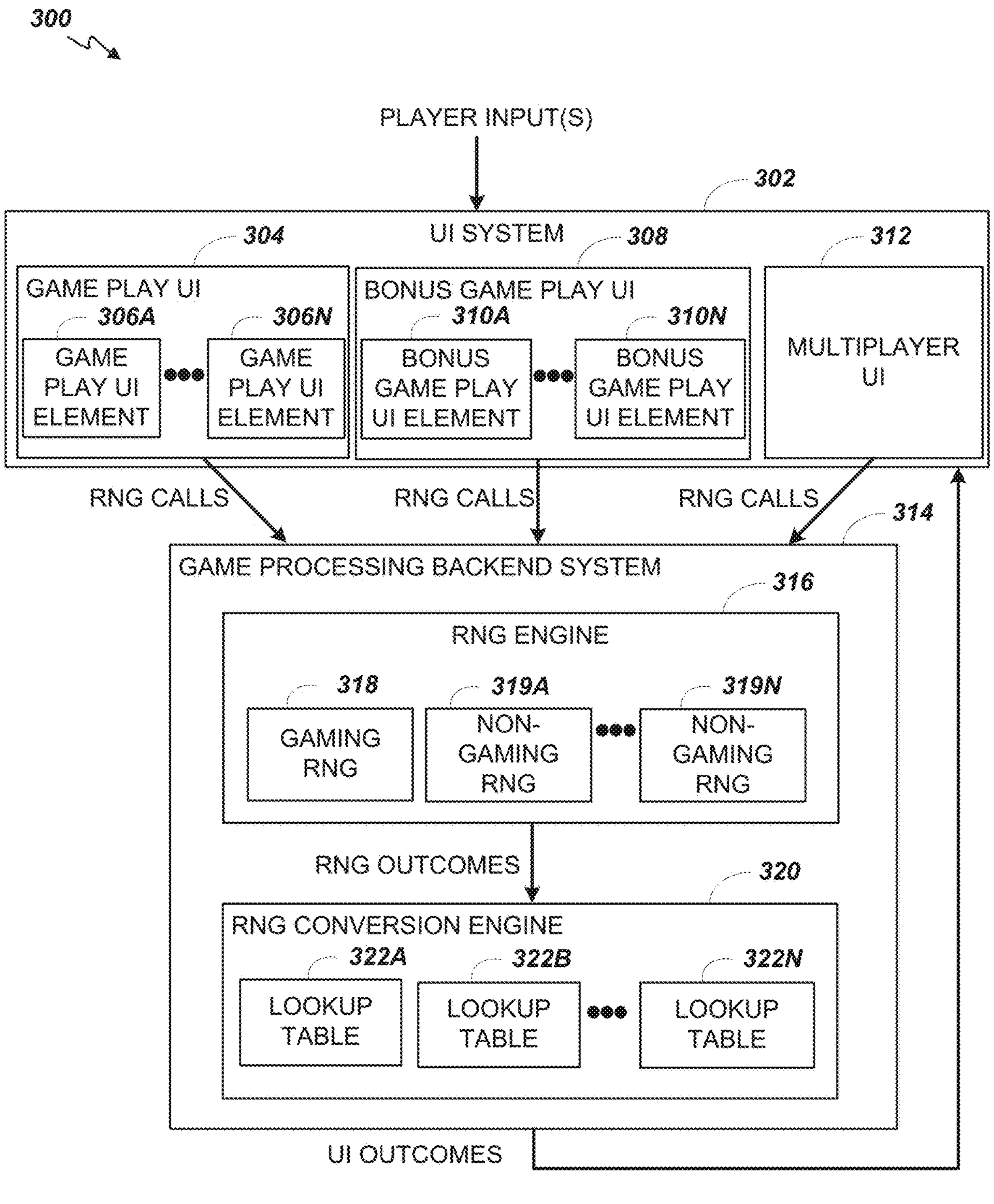
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Generally, an EGM 104 may include a display 128 (whether a primary display 128A, secondary display 128B, or both) that incorporates a component passthrough. The display 128 may be formed from a display layer and a cover. The display layer emits light to form images, text, animations or the like while the cover overlays the display layer. The display layer may be a liquid crystal layer, light-emitting diode layer, organic light-emitting diode layer, and so on. The cover is typically made from glass, plastic, synthetic sapphire, or another optically transparent, protective material. The cover may be transparent to other frequencies of electromagnetic radiation and/or sound.

The component passthrough is typically formed in the display layer and sits beneath the cover. The cover, by contrast, overlies both the display layer and the component passthrough in many embodiments (e.g., the component passthrough is formed in the display layer but not the cover). However, in some embodiments, the component passthrough may extend through both the display layer and the cover. For example, where a gaming component such as a player tracking system, bill validator 124, and/or ticket-out printer 126, other wager acceptance mechanism, and the like are positioned at least partially behind the display 128, the component passthrough may extend through the display layer and cover to permit a player to insert or accept a bill, credit card, player card, or ticket into an input or output of the gaming component while concealing a majority of the component within the EGM 104 and behind the display 128. This permits a relatively bulky or large gaming component to be partially or fully concealed from a player's view while permitting the gaming component to perform its function, such as accepting a wager, tracking play of a player, providing a ticket or other credit instrument to a player, detecting a player's approach or departure, and so on.

As yet another example, one or more reels or playing elements, or other gaming components, of a game executing on the EGM 104 may extend through a component passthrough defined in the display layer but not in the cover. This may be useful to prevent the player from touching or physically interacting with the gaming component while still permitting the gaming component to perform its function. In the example where the gaming component is a reel or set of reels of a slot-type game, the reels may be viewed by the player but shielded from player touch or tampering by the cover.

Figure 4:
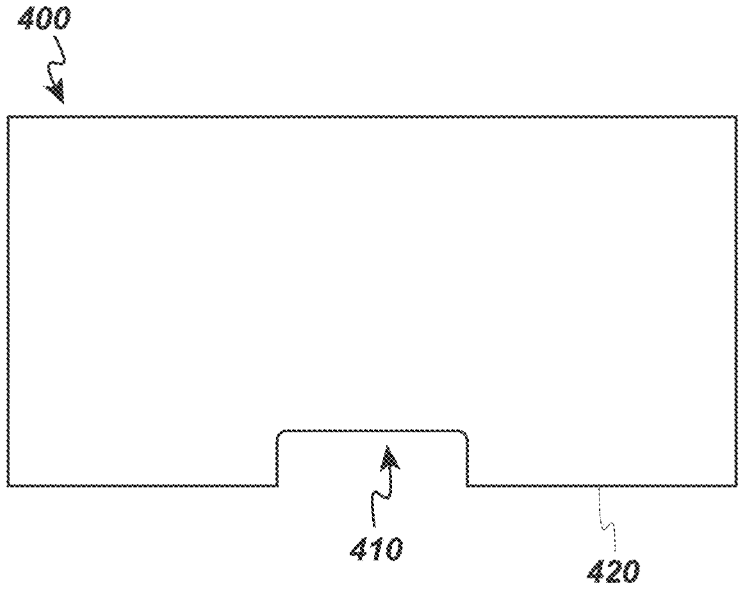
FIG. 4 illustrates a sample display having a component passthrough formed on an edge thereof.

FIG. 4 illustrates one sample embodiment of a display 400 having a component passthrough 410 formed therein. Here, the component passthrough 410 is a notch formed in a side 420 of the display. The notch 410 extends inwardly from the edge 420, towards a middle and into an interior area of the display 400. The component passthrough 410 (e.g., notch) provides a passthrough through the display 400, or at least a light-emitting layer of the display. (In some embodiments, a glass or cover of the display 400 lacks any component passthrough defined therein or thereon.) A component may be positioned behind the display such that it communicates with an environment external to the display, or associated EGM, through the component passthrough 410. For example, a speaker, sensor, transmitter, receiver, transceiver or the like may be positioned beneath the display 400 and, optionally, within an interior volume of an EGM housing, and either output a signal or receive an input (such as data regarding a temperature, presence or absence of a person, or other environmental factor) through the component passthrough, thereby bypassing, reducing, or eliminating any effect from transmitting or receiving through the display 400 itself.

Certain embodiments may conceal a component or a majority of a component, such as a gaming component, beneath a display while an input or output of the component operates through the component passthrough 410. The input or output of the component may be flush with the display layer or cover of the display 400 (or otherwise extend into the component passthrough) or may be beneath the display layer or cover (e.g., recessed from the display 400). As a first example, where the gaming component is a bill validator, the bill acceptor (e.g., input) of the validator may extend through a component passthrough 410 defined in both the display layer and cover of a display 400. As another example, where the gaming component is a player tracking system using RFID, NFC, Bluetooth or the like to track a player's activity, the component passthrough 410 may extend through a display layer but not a cover of the display while the gaming component is positioned fully or partially beneath the display 400.

Although the component passthrough 410 is shown as formed at or on an edge 420 of the display 400, in some embodiments the component passthrough may be formed at or in a corner. In such embodiments, the component passthrough may extend from one edge to an adjacent edge, and a bounding surface of the component passthrough (e.g., the surface extending from edge to edge) may be flat, curved, stepped, or any other suitable shape.

As previously mentioned, a component passthrough 410 may be formed in a display layer of a display and covered by a cover layer of the display 400. In some embodiments where this is the case, a portion of the cover layer overlaying the component passthrough 410 may be painted, screened, impregnated or otherwise treated (through vapor deposition, for example) with an optically opaque material that is transparent, or semi-transparent, to other frequencies of electromagnetic radiation and/or sound. The optically opaque material may be colored to match the color of the display layer when it is inactive (e.g., black) or colored to match adjacent portions of the display layer when the display layer is active. This may effectively optically conceal the component passthrough 410 and any component beneath the passthrough from player view.

In other embodiments, the component passthrough 410 may be filled with an optically opaque material that is transparent to other frequencies of electromagnetic radiation and/or sound. In such embodiments, the component passthrough 410 may extend through both the display layer and the cover of the display 400. It should be appreciated that any component passthrough of any embodiment discussed herein may be treated or filled with such material.

Figure 5:
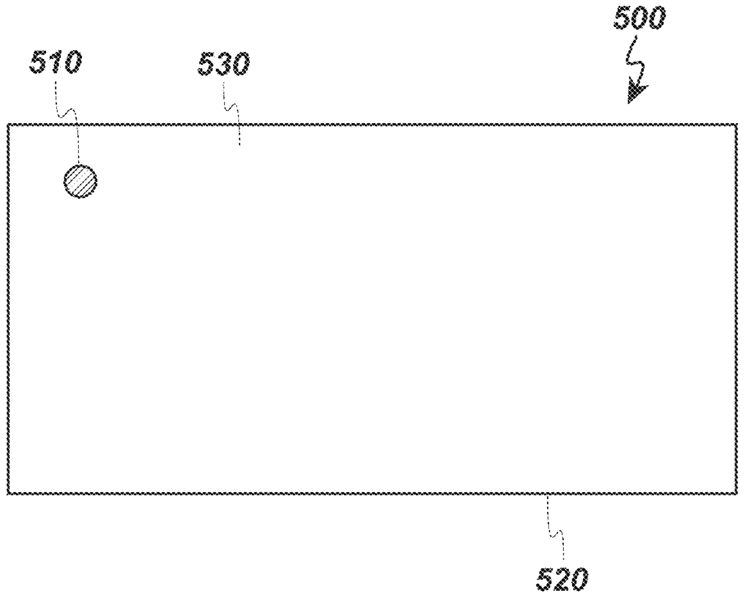
FIG. 5 illustrates a sample display of an EGM having a component passthrough formed in an interior area thereof.

In some embodiments and as shown in FIG. 5, the component passthrough 510 may be formed in an interior area 530 of a display 500 rather than along an edge 520. In such embodiments, the component passthrough 510 nonetheless may function similarly to the shaped notch 410 shown in FIG. 4 or any other component passthrough described herein (e.g., permitting passage of a sensor output, audio, transmitted data, or the like through the display). Further, insofar as the component passthrough 510 is surrounded on all sides by portions of the display 500, a component may be more effectively hidden from sight beneath the display and within an EGM as compared to a component passthrough formed on an edge of a display. A component passthrough 510 in an interior area 530 of a display 500 may be especially useful if the component beneath the display is a gaming component, such as a reel or set of reels.

Figure 6:
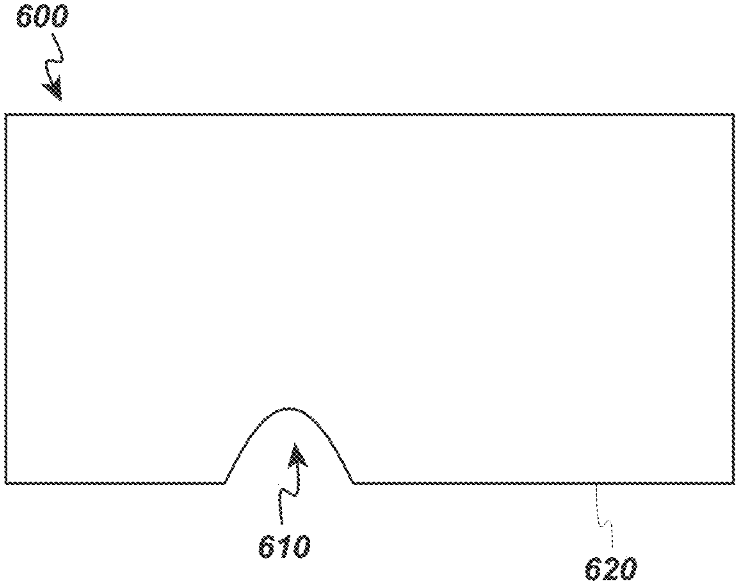
FIG. 6 illustrates a sample display having a trilobe component passthrough formed on an edge thereof.
Figure 7:
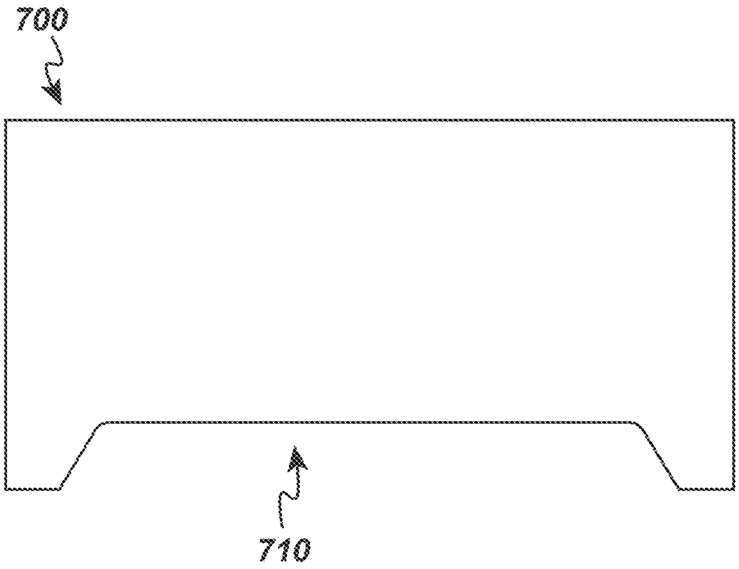
FIG. 7 illustrates a sample display having a component passthrough with angled sidewalls formed on an edge thereof.
Figure 8:
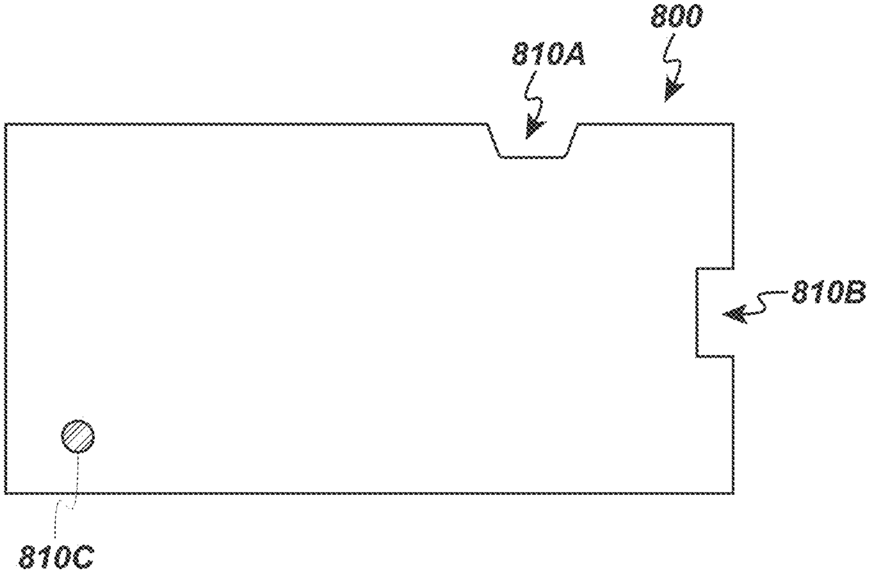
FIG. 8 illustrates a sample display having a multiple component passthroughs formed thereon.
Figure 9:
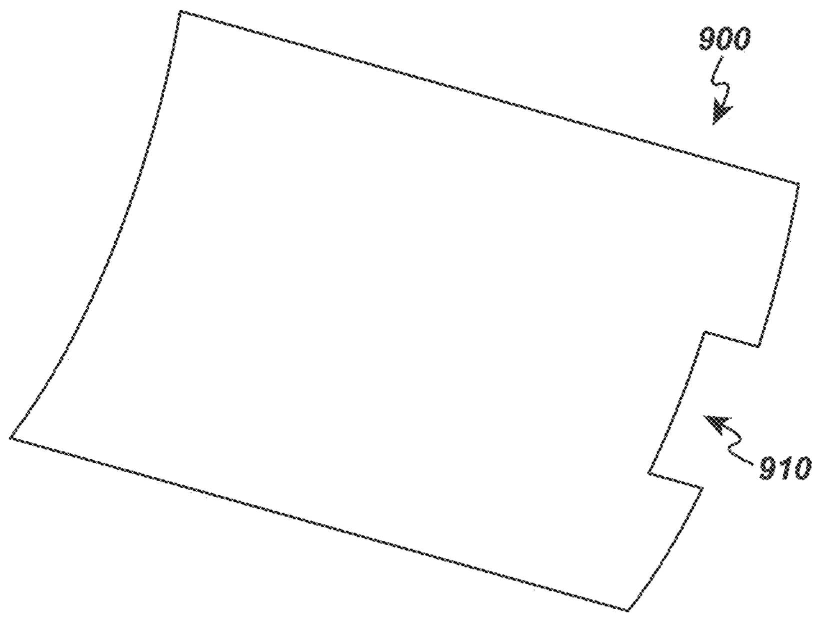
FIG. 9 illustrates a sample curved display having a component passthrough formed on an edge thereof.

Although the component passthrough is shown as a notch in a display, it may take any of a variety of forms. For example, the component passthrough 610 may be a trilobe formed in a display 600, as shown in FIG. 6. As another example, the component passthrough 710 may have angled sidewalls and/or occupy a significant portion of a display's 700 edge, as shown in FIG. 7. Multiple component passthroughs 810*a*, 810*b*, 810*c* may be formed in a single display 800, as shown in FIG. 8. With respect to FIG. 9, it can be seen that the display 900 need not be planar but can be curved and support or integrate a component passthrough 910. Substantially any shape or configuration of display and/or component passthrough may be used in various embodiments.

Figure 10:
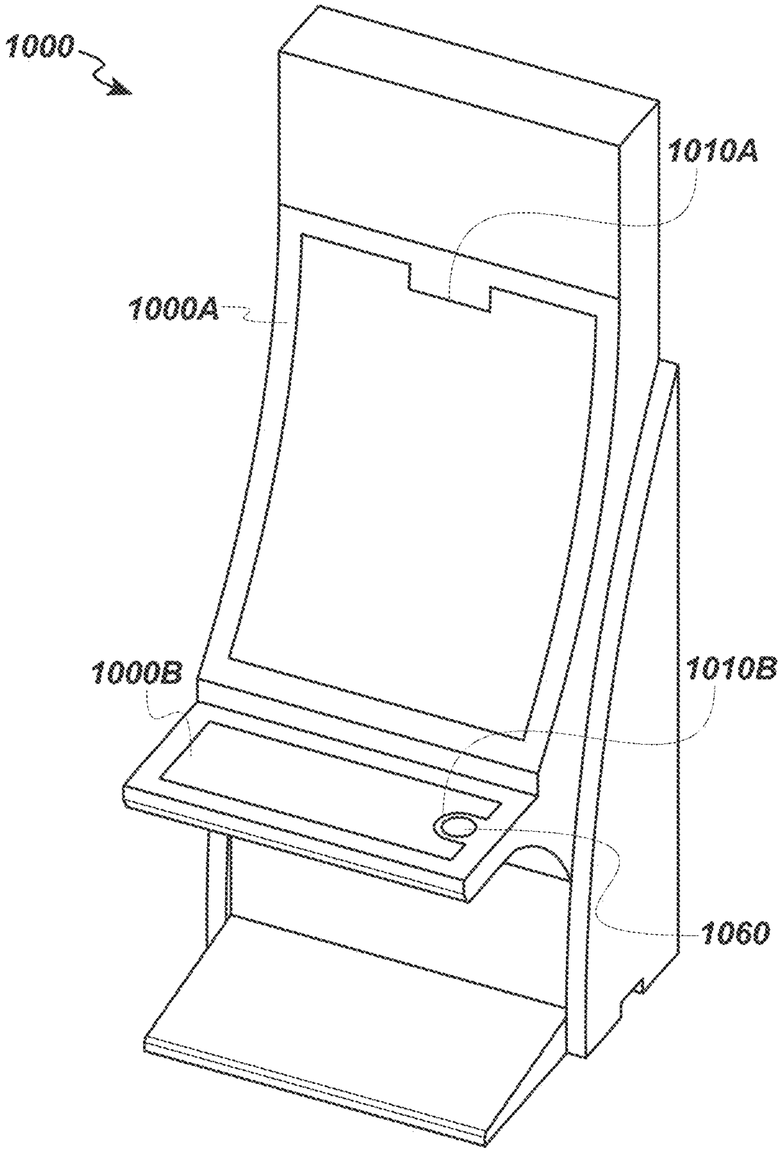
FIG. 10 illustrates a sample EGM having a secondary display with a component passthrough formed on an edge thereof.

FIG. 10 generally shows an EGM 1050 having a primary display 1000*a* and secondary display 1000*b*. The primary display 1000*a* includes a first component passthrough 1010*a* while the secondary display 100*b* incorporates a second component passthrough 1010, here in the form of a cutout to partially surround a button 1060. Thus, it can be seen that secondary displays of an EGM may incorporate component passthroughs to mask components within the EGM while permitting their communication or operation with an external environment. Further, the component passthroughs 1010*b* described herein may be formed to accommodate a feature external to the display 1000*b*, such as an input (e.g., button 1060), graphic, raised portion of a housing, and the like. In some embodiments, the button 1060 may be replaced by, or accompanied by, a joystick, slider, lever, or other type of input.

Figure 11:
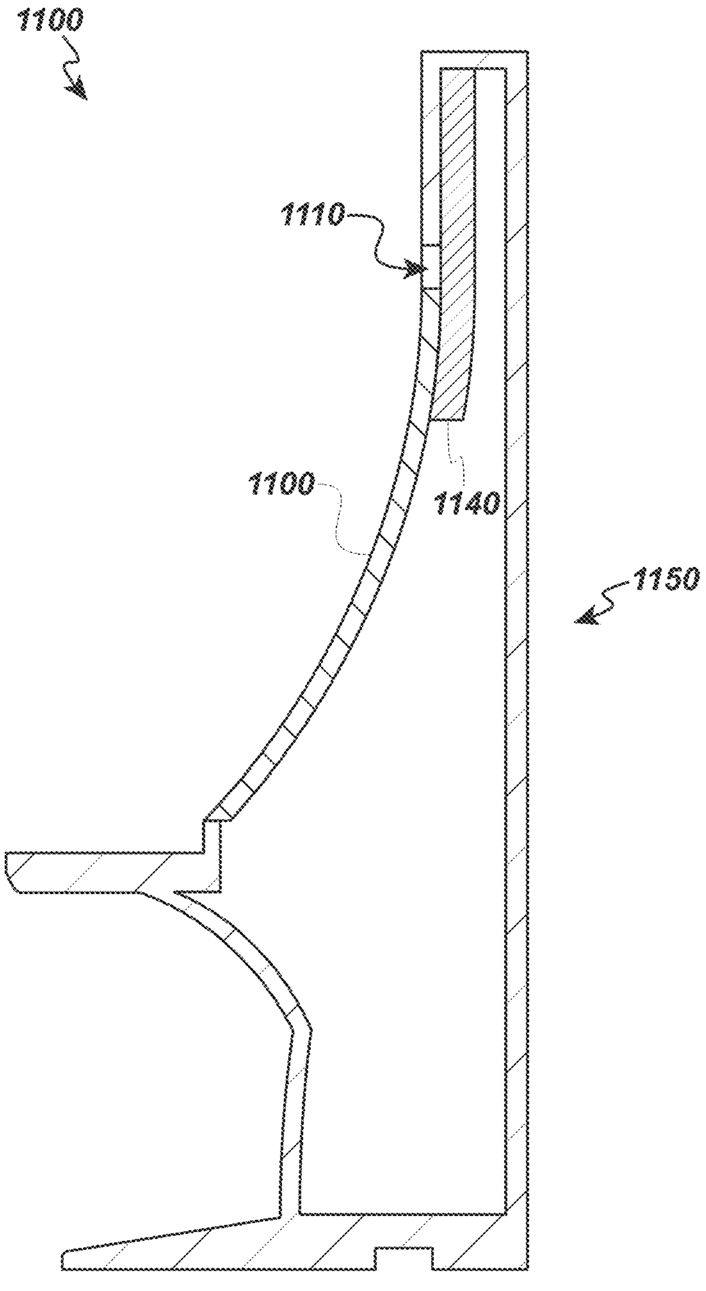
FIG. 11 is a cross-sectional, simplified side view showing an electronic component of an EGM concealed behind a display.

FIG. 11 is a cross-sectional, simplified side view showing an electronic component 1140 of an EGM concealed behind a display 1100 of an EGM 1150 while providing output through a component passthrough 1110 formed in the display 1100, thereby generally demonstrating one example orientation of electronic components with respect to the display and component passthrough.

As shown in FIG. 11, the electronic component 1140 (which may be a gaming component) can be positioned beneath the display 1100 and within an interior volume of a housing in such a way that the component 1140 extends beneath the display in opposing directions from the component passthrough 1110. Put another way, the component 1140 may extend away from the component passthrough 1110 in first and second directions and be positioned beneath the display 1100 in both the first and second directions. Indeed, the component 1140 may extend away from the passthrough 1100 and beneath the display 1100 in multiple directions. An edge of the component need not align with an edge of the passthrough although this is certainly possible in some embodiments.

Further, in some embodiments the component passthrough 1110 may have a stepped or angled profile or cross-section. For example, the component passthrough 1110 may be larger in cross-section in the display layer than in the cover layer, or may step or angle within a single such layer. This may permit an electronic component 1140 having elements proud of a primary surface to be accommodated by the component passthrough 1110 while taking up less space within the EGM 1150 than if the component passthrough were of uniform cross-section.

In some embodiments the electronic component 1140 may protrude through the component passthrough 1110. The electronic component 1140, which may be a gaming component, may be proud of the display surface (e.g., proud of the cover) or may be proud of the display layer surface. The electronic component 1140 may protrude through the component passthrough 1110 when it is to be seen by a player (as when the component is a reel in a slot-type game or a playing field of a wagering game) or to be physically interacted with by the player (as when the component is a TITO component, a wagering acceptance mechanism, or the like).

Figure 12:
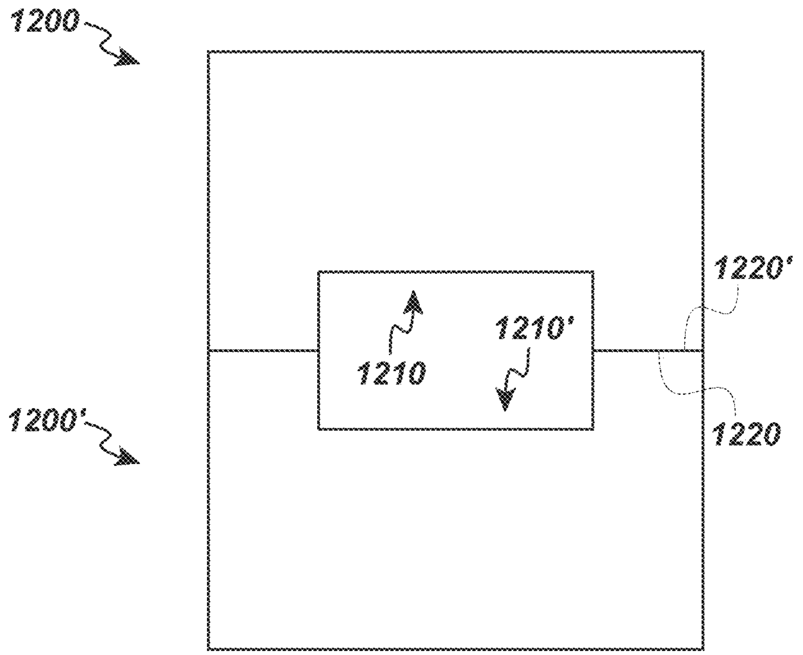
FIG. 12 shows two abutting displays, each with a component passthrough.

Further, multiple displays may be incorporated into a single EGM and each such display may have its own component passthrough. One example configuration is shown in FIG. 12. In some embodiments, two displays 1200, 1200' may be placed such that their edges 1220, 1220' abut one another. Separate component passthroughs 1210, 1210' may be formed in each such display. As further shown in FIG. 12, these component passthroughs 1210, 1210' may be adjacent one another to form a contiguous, larger aperture through the paired display 1200, 1200'.

Although notches and other component passthroughs are shown herein as voids within a display, certain embodiments may fill such component passthroughs with a material. This material may be optically transparent in certain embodiments, for example where the internal component is a light sensor or provides some type of light output. As another option, the material may be optically opaque but transparent to sound or electromagnetic waves of certain frequencies (for example, other than those in the visible spectrum), thereby permitting the internal electronic component to output signals of these frequencies or receive signals of these frequencies without substantial attenuation or degradation.

While the disclosure has been described with respect to the figures and certain embodiments, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming machine, comprising:

a housing;

a processor;

a display coupled to the housing and operative to display a game played by a player, wherein the display comprises a light-emitting display layer and cover layer overlying the display layer;

a component passthrough defined as at least one of a recess in an edge of the display or an aperture within an area of the display, wherein the component passthrough is formed in the display layer and the cover layer overlays the component passthrough; and an electronic component at least partially disposed within the housing configured to communicate with an external environment of the electronic gaming machine through the component passthrough.

2. The electronic gaming machine of claim 1, wherein the electronic component is a gaming component.

3. The electronic gaming machine of claim 1, wherein the display is curved.

4. The electronic gaming machine of claim 1, wherein the electronic component is a wager acceptance mechanism.

5. The electronic gaming machine of claim 1, wherein the component passthrough is filled with a material.

6. The electronic gaming machine of claim 5, wherein the material is an optically opaque material.

7. The electronic gaming machine of claim 6, wherein the optically opaque material conceals the electronic component.

8. An electronic gaming machine, comprising:

a housing defining an interior volume;

a display affixed to the housing, wherein the display comprises a light-emitting display layer and cover layer overlying the display layer;

a component passthrough defined as at least one of an edge of the display or within an area of the display, wherein the component passthrough is formed in the display layer and the cover layer overlays the component passthrough; and a gaming component at least partially positioned within the housing such that the gaming component functions through the component passthrough.

9. The electronic gaming machine of claim 8, wherein the gaming component is one of a wager acceptance mechanism, a ticker printer, a TITO system, a player tracking system, or a reel.

10. The electronic gaming machine of claim 8, wherein the component passthrough is filled with a material that matches an appearance of a portion of the display adjacent the component passthrough.

11. The electronic gaming machine of claim 10, wherein the material is transparent to sound or electromagnetic waves.

12. The electronic gaming machine of claim 8, wherein:

the component passthrough extends through the display layer of the display; and the gaming component extends at least partially through the display layer of the display.

13. The electronic gaming machine of claim 8, wherein a player is able to physically interact with the gaming component.

14. The electronic gaming machine of claim 8, wherein:

the gaming component extends through the display layer of the display but not the cover layer of the display.

15. An electronic gaming machine, comprising:

a housing;

a display affixed to the housing, wherein the display comprises a light-emitting display layer and cover layer overlying the display layer;

a component passthrough defined in the display, wherein the component passthrough is formed in the display layer and the cover layer overlays the component passthrough; and a gaming component located behind the component passthrough, wherein the cover layer of the display conceals at least part of the gaming component.

16. The electronic gaming machine of claim 15, wherein at least a second part of the gaming component is not concealed from view by the display.

17. The electronic gaming machine of claim 16, wherein a player is able to physically interact with the second part of the gaming component.

18. The electronic gaming machine of claim 17, wherein the component passthrough is stepped in cross-section.

19. The electronic gaming machine of claim 16, wherein the second part of the gaming component is an input of the gaming component.

* * * * *